United States Patent [19]

Yoshifuji

[11] 4,300,408
[45] Nov. 17, 1981

[54] CONTROL CABLE

[75] Inventor: Junnosuke Yoshifuji, Takarazuka, Japan

[73] Assignee: Nippon Cable System Inc., Hyogo, Japan

[21] Appl. No.: 123,708

[22] Filed: Feb. 22, 1980

[30] Foreign Application Priority Data

Oct. 5, 1979 [JP] Japan .............................. 54-129178

[51] Int. Cl.³ .......................... F16C 1/10; C10M 5/26; C10M 7/50
[52] U.S. Cl. .................................. 74/501 R; 252/12; 252/49.6; 585/2; 585/10
[58] Field of Search ............. 74/501 R; 252/12, 49.6; 585/2, 10

[56] References Cited

U.S. PATENT DOCUMENTS

| 3,729,415 | 4/1973 | Davis et al. | 252/12 |
| 3,779,918 | 12/1973 | Ikeda et al. | 252/12 |
| 3,980,570 | 9/1976 | Okuda et al. | 252/12 |
| 4,065,395 | 12/1977 | Bailey | 252/49.6 |
| 4,193,319 | 3/1980 | Langford | 74/501 R |

FOREIGN PATENT DOCUMENTS 46-5321 of 1971 Japan .................................. 252/12

Primary Examiner—Delbert E. Gantz
Assistant Examiner—Irving Vaughn
Attorney, Agent, or Firm—Armstrong, Nikaido, Marmelstein & Kubovcik

[57] ABSTRACT

A control cable comprising an inner cable, a conduit and a lubricating layer interposed between, formed from a composition of high density polyethylene powders or pellets and a fluoro-alkylated silicone oil, thereby improving the slippage and the wear resistance of an inner cable, and being superior to endurance over a long period of time.

7 Claims, 3 Drawing Figures

CONTROL CABLE

BACKGROUND OF THE INVENTION

The present invention relates to a control cable being superior to the slippage and the wear resistance, due to interposing a lubricating layer formed from a specific composition between an inner cable and a conduit.

The control cable is essentially constructed from the flexible conduit and the inner cable which comprises a bundle of metal wires stranded from several metal wires or only a metal wire, and which inserts into the conduit. The control cable achieves the function for controling remotely the operative equipment, and is, for example, used for operation of transmission, brake, clutch, speedometer or the like in automobile, autocycle, bicycle or the like. Therefore, to function smoothly such a control cable, it is necessary that the wear resistance between the inner surface of the conduit and the inner cable becomes as little as possible, and therefor it is well known to adopt frequently such methods as to apply a lubricating agent, e.g. grease, silicone oil, on the inner cable, to interpose the lubricating agent between the inner cable and the conduit, to provide the coating layer made of a synthetic resin, such as high density polyethylene, polytetrafluoroethylene, on the inner cable, or to interpose a tubular liner made of the above synthetic resin between the inner cable and the conduit. However, the control cable in which such lubricating agent or synthetic resin is employed as a coating layer or a liner has never been sufficient in the view that the inner liner is inferior to the slippage and the wear resistance thereof, and therefore cannot use over the long period of time.

OBJECTS OF THE INVENTION

The main object of the present invention is to provide a control cable which is remarkably superior to the slippage and the wear resistance.

Another object of the invention is to provide a control cable which can do the operation of the movable inner cable with ease and smoothness.

Another object of the invention is to provide a control cable which can preferably use over a long period of time.

Other objects and advantages of the invention will become more apparent from the following descriptions and drawings.

DETAILED EXPLANATION OF THE INVENTION

The present invention relates to a control cable comprising an inner cable, a conduit and a lubricating layer interposed therebetween, and the lubricating layer being formed from a composition obtained by admixing a fluoro-alkylated silicone oil and high density polyethylene powders or pellets.

Such a lubricating layer formed from the specific composition eliminates the above-mentioned drawbacks as in the case of the conventional control cable adopting the lubricating agent or the liner of the synthetic resin alone, improves significantly the slippage and the wear resistance of the inner cable, performs the more easy operation of the movement of the inner cable, and therefore provides the control cable being capable of enduring against employment of a long period of time.

The above lubricating layer is, for example, formed as a coating layer provided on the inner cable, a liner interposed between the inner cable and the conduit, or the liner fixed at at least one part of the inner surface of the conduit.

Hereinafter, the lubricating layer in the present invention will be explained as a coating layer or a liner.

Figure 1:
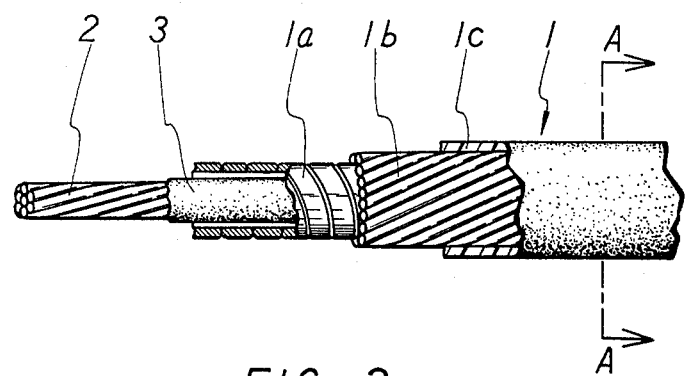
FIG. 1 is a perspective view partly broken away for showing an embodiment of the control cable of the present invention.
Figure 2:
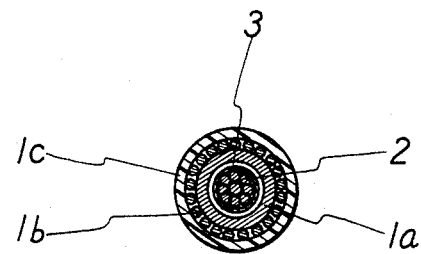
FIG. 2 is a schematic sectional view taken on line A—A of FIG. 1.
Figure 3:
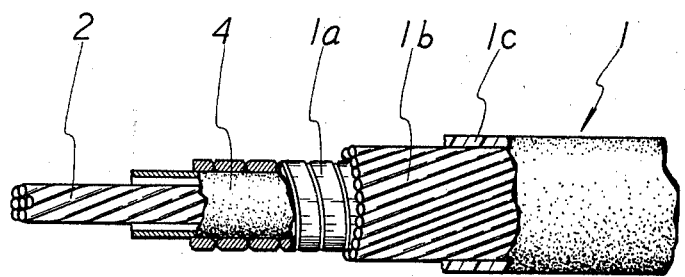
FIG. 3 is a perspective view partly broken away for showing another embodiment of the present invention.

With regard to FIGS. 1 to 3, indicated as 1 is the conduit, the conduit 1 comprises a helical tube 1a formed by helically winding a flat steel wire, a seal tube 1b for sealing the helical tube 1a by a circular steel wire, and a coating 1c of synthetic resin providing on the seal tube 1b. The conduit 1 is not limited to only the above form, but can preferably adopt everything of conventional conduits for the control cable. Indicated as 2 is the inner cable inserted slidably into the conduit 1, and is normally formed from stranding several metal wires. Indicated as 3 is the coating layer providing on the inner cable 2, and indicated as 4 is a liner which is interposed between the conduit 1 and the inner cable 2 (or which may be fixed, in part, to the inner surface of the conduit 1, i.e. the inner surface of the helical tube 1b). The coating layer 3 and the liner 4 as a lubricating layer are made of the composition obtained by admixing the fluoro-alkylated silicone oil and the high density polyethylene powders or pellets.

The high density polyethylene powders or pellets used in the present invention are those obtained by the medium- or low-pressure polymerization process, and are those of which the density is 0.900 to 0.958, and of which the average molecular weight is 150,000 to 200,000. The typical commercially-available polyethylene is, for example, trademark "SHOLEX 6002B" (manufactured by Showa Denko K.K.), trademark "Hizex 8000" (manufactured by Mitsui Petrochemical Industries, Ltd.) or the like.

The fluoro-alkylated silicone oil used in the present invention is, for example, one or more of silicone oils comprising a trifluoro-propyl-methyl-silicone, such as trademark "FS-1265-1000" (manufactured by Toray Silicone Kabushiki Kaisha), Trademark "FL-100" (manufactured by Shin-Etsu Chemical Co., Ltd.) or the like.

The fluoro-alkylated silicone oil is admixed with 100 parts by weight of high density polyethylene powders or pellets at the rate of 0.5 to 3 parts by weight, preferably 1.3 to 1.8 parts by weight. Thus, the coating layer or liner obtained improves the slippage and the wear resistance of the inner cable, shows more significant wear resistance than one obtained from polytetrafluoroethylene resin alone, and further has the easiness of the extrusion molding.

When the amount of the fluoro-alkylated silicone oil is larger than 3 parts by weight per 100 parts by weight of high density polyethylene powders or pellets, the obtained composition causes difficulty for the extrusion molding. On the other hand, when the amount of the above silicone oil is less than 0.5 parts by weight, the friction and wear resistance effects of the obtained coating layer 3 or liner 4 are decreased.

According to the present invention, as mentioned above, the composition obtained by admixing the high density polyethylene powders or pellets and the fluoroalkylated silicone oil is used as a raw material of the coating layer 3 or liner 4. For example, in case of adopting the roll admixing process as the admixing means, the temperature of 180° to 230° C., preferably 160° to 200° C., and the admixing time of 2 to 5 min. are adopted, whereby the obtained composition is superior to the slippage and the wear resistance. In the process of the roll admixing, a filler, such as $MoS_2$, carbon, graphite or the like, may be added to the composition. Also, although the coating layer 3 or the liner 4 may be formed by any conventional means, it is preferable in the points of the high efficiency of the work that the coating layer 3 or the liner 4 is formed by a extruder (i.e. the coating layer 3 is formed by applying the above specific composition onto the inner cable 2, and the liner 4 is formed by extruding the above specific composition to the tubular form). The thickness of the obtained coating layer 3 and liner 4 is usually adopted from the range of 0.1 of 0.4 mm. and of 0.2 to 0.5 mm., respectively.

The experimental result for investigating the friction-wear characteristics of the compositions (Samples 1 to 6) obtained by admixing the fluoro-alkylated silicone oil as a lubricating oil and high density polyethylene powders (trademark "SHOLEX 6002B" manufactured by Showa Denko K.K., density: 0.914, average molecular weight: 150,000) in accordance with the present invention, in comparison with those of the compositions (Comparative Samples 1 to 6) obtained by admixing the silicone oil as a lubricating oil and the above polyethylene powders, will be set forth hereinafter.

Each composition of the Samples 1 to 6 and the Comparative Samples 1 to 6 used in the experiment is shown in Table 1. Each friction-wear characteristic was measured by Suzuki-type friction testing machine, made by Toyo Sokki Kabushiki Kaisha, in which a pair of hollow cylindrical test pieces axially oppose and slipe each other at 30° m./sec. of slipping speed (i.e., the rotational speed in the outer surface of the average radius of the test pieces) under each load shown in Table 1 in ambient atmosphere. The obtained results are shown in Table 1.

TABLE 1

| | | Lubricating oil | (% by weight) | Amount of friction-wear (kg.) | | | | | Weared time (min.) |
|---|---|---|---|---|---|---|---|---|---|
| | | | | 10kg. | 20kg. | 30kg. | 40kg. | 50kg. | |
| Sample | 1 | Fluoro-alkylated silicone oil (trademark "FL-100" manufactured by Shin-Etsu Chemical Industries Co., Ltd.) | 0.05 | 2.0 | 2.2 | 3.0 | 3.2 | 4.0 | 3.0 |
| | 2 | Fluoro-alkylated silicone oil (trademark "FL-100" manufactured by Shin-Etsu Chemical Industries Co., Ltd.) | 0.1 | 2.0 | 2.1 | 3.0 | 3.2 | 3.8 | 2.0 |
| | 3 | Fluoro-alkylated silicone oil (trademark "FL-100" manufactured by Shin-Etsu Chemical Industries Co., Ltd.) | 0.3 | 2.0 | 2.0 | 3.0 | 3.2 | 3.6 | 4.5 |
| | 4 | Fluoro-alkylated silicone oil (trademark "FL-100" manufactured by Shin-Etsu Chemical Industries Co., Ltd.) | 0.5 | 1.8 | 2.0 | 2.8 | 3.2 | 4.0 | 12.0 |
| | 5 | Fluoro-alkylated silicone oil (trademark "FL-100" manufactured by Shin-Etsu Chemical Industries Co., Ltd.) | 1.0 | 1.6 | 2.0 | 2.6 | 3.2 | 4.0 | 12.5 |
| | 6 | Fluoro-alkylated silicone oil (trademark "FL-100" manufactured by Shin-Etsu Chemical Industries Co., Ltd.) | 2.0 | 0.6 | 1.0 | 1.3 | 1.8 | 2.0 | 115200 |
| Comp. Sample | 1 | Silicone oil (trademark "FF-96" manufactured by Shin-Etsu Chemical Industries Co., Ltd.) | 0.05 | 2.0 | 3.2 | 3.6 | 4.0 | 4.5 | 2.0 |
| | 2 | Silicone oil (trademark FF-96" manufactured by Shin-Etsu Chemical Industries Co., Ltd.) | 0.1 | 2.0 | 3.0 | 3.5 | 4.0 | 4.5 | 3.5 |
| | 3 | Silicone oil (trademark "FF-96" manufactured by Shin-Etsu Chemical Industries Co., Ltd.) | 0.3 | 2.0 | 2.5 | 2.8 | 3.0 | 3.4 | 3.5 |
| | 4 | Silicone oil (trademark "FF-96" manufactured by Shin-Etsu Chemical Industries Co., Ltd.) | 0.5 | 2.0 | 2.5 | 2.8 | 3.0 | 3.4 | 5.0 |
| | 5 | Silicone oil (trademark "FF-96" manufactured by Shin-Etsu Chemical Industries Co., Ltd.) | 1.0 | 1.8 | 2.0 | 2.8 | 3.0 | 3.5 | 10.0 |
| | 6 | Silicone oil (trademark | | | | | | | |

TABLE 1-continued

| Lubricating oil | (% by weight) | Amount of friction-wear (kg.) 10kg. | 20kg. | 30kg. | 40kg. | 50kg. | Weared time (min.) |
| --- | --- | --- | --- | --- | --- | --- | --- |
| "FF-96" manufactured by Shin-Etsu Chemical Industries Co., Ltd.) | 2.0 | 1.8 | 2.0 | 2.8 | 3.0 | 3.5 | 15.0 |

As shown in Table 1, the compositions (Samples 1 to 6) obtained by admixing the fluoro-alkylated silicone oil as a lubricating oil show the excellent friction-wear resistance, and especially, in the points of the wear resistance, the large difference between the composition obtained by adding 2% by weight of the silicone oil and one obtained by adding 2% by weight of the fluoroalkylated silicone oil is observed (i.e. in approximately the same amount of the friction-wear, the former's weared time was 15 minutes, while the latter's weared time was 115200 minutes). Therefore, it is obvious that the composition obtained by admixing the fluoroalkylated silicone oil is superior to the slippage and the wear resistance.

The experimental result for investigating the enduring efficiency of the control cable of the present invention, in comparison with the control cable of which the liner does not include the fluoro-alkylated silicone oil, will be set forth hereinafter. The above enduring efficiency becomes the basis for deciding whether or not the control cable is superior to the slippage and the wear resistance. Thus, the more the value of the enduring efficiency is large, the more the slippage and the wear resistance are superior, whereby the control cable having the large value of the enduring efficiency can use over a long period of time.

The control cable (Example) of the present invention, which was prepared for the experiment, comprises the liner 4 having outer diameter of 5.1 mm. and inner diameter of 4.5 mm., which was obtained from the composition of 100 parts by weight of the high density polyethylene powders (trademark "SHOLEX 6002B" manufactured by Showa Denko K.K., density: 0.914, average molecular weight: 150,000) and 2 parts by weight of the fluoro-alkylated silicone oil (trademark "FL-100" manufactured by Shin-Etsu Chamical Co., Ltd., content of fluorine: 1.8% by weight) by means of the extruder, the conduit 1 having outer diameter of 10 mm., which was provided on the liner 4 by winding fixedly the helical tube 1a, and the inner cable 2 constructed from double stranded 60 carbon steel wires (zinc plating) having diameter of 3 mm., and inserted into the liner 4. The control cable, as a Comparative Example, was formed by the same manner as mentioned above except that the high density polyethylene powders (the same powders as in Example) were used alone.

Each of these control cables was adopted for measuring the enduring efficiency. The result is shown in Table 2.

The enduring efficiency of each control cable was measured by the method that the control cable was bent to U-shape at radius of 200 mm., and a load spring of 150 kg. was attached to the one end of the inner cable thereof, and after repeating the tensing and laxing operation at the other end of the inner cable at stroke speed of 60 times/min. and stroke distance of 30 mm. for 16 hours at room temperature, 4 hours at $-30°$ C., 4 hours at 80° C. and further about 3 hours plus 47 minutes at room temperature, a load cell was attached to the above other end to know the power required for pulling upwardly the load spring of 150 kg. attached to the above one end, when the other end was tensed under room temperature, $-30°$ C., 80° C., respectively.

The enduring efficiency was calculated by the following equation.

$$\text{Enduring efficiency (\%)} = (150/F) \times 100$$

F: Power measured by the load cell (kg.)

TABLE 2

| Sample | Condition of mesuring | Enduring efficiency (%) Tension-laxation of 0 time (Initiation) | Tension-laxation of 100,000 times |
| --- | --- | --- | --- |
| Example | Room temperature | 93.75 | 93.16 |
|  | $-30°$ C. | 93.16 | 91.46 |
|  | $-80°$ C. | 88.75 | 87.20 |
| Comp. Example | Room temperature | 90.96 | Each liner weared out, was not measurable. |
|  | $-30°$C. | 87.71 |  |
|  | $-80°$ C. | 85.71 |  |

As shown in Table 2, in the control cable (Comparative Example) of which the liner was formed from the high density polyethylene powders alone and did not include the fluoro-alkylated silicone oil, the liner weared out, and it was impossible to measure the enduring efficiency. On the other hand, the control cable (Example) of the present invention had the enduring efficiency of 87 to 94%, even though the tensing-laxing operation has been repeated up to 100,000 times. As a result, it is obvious that the control cable of the present invention is significantly superior to the slippage and the wear resistance, and can use over a long period of time.

Although the above measured result of the enduring efficiency was explained in regard to the case that the liner 4 was fixed to the inner surface of the conduit 1, in the case that the liner 4 was interposed between the inner cable 2 and the conduit 1, or the coating layer 3, instead of the liner 4, was provided on the inner cable 2, the control cable of the present invention had also the enduring efficiency of 87 to 94%, even though the tensing-laxing operation has been repeated up to 100,000 times, and therefore was significantly superior to the slippage and the wear resistance, and could use over a long period of time.

What is claimed is:

1. In a control cable comprising an inner cable and a conduit, the improvement which comprises a lubricating layer, which is formed from a composition obtained by admixing high density polyethylene powders or pellets and a fluoro-alkylated silicone oil, being interposed between the inner cable and the conduit.

2. The control cable of claim 1, wherein said lubricating layer is a coating layer provided on the inner cable.

3. The control cable of claim 1, wherein said lubricating layer is a liner interposed between the inner cable and the conduit.

4. The control cable of claim 3, wherein said liner is fixed at at least a part of the conduit.

5. The control cable of claim 1, wherein said high density polyethylene powders or pellets have the density of 0.900 to 0.958, and the average molecular weight of 150,000 to 200,000.

6. The control cable of claim 1, wherein said fluoro-alkylated silicone oil is a trifluoro-propylmethyl-silicone.

7. The control cable of claim 1, wherein said composition is an admixture of 100 parts by weight of high density polyethylene powders or pellets and 0.5 to 3 parts by weight of fluoro-alkylated silicone oil.

* * * * *